United States Patent

[11] 3,612,630

| | | |
|---|---|---|
| [72] | Inventor | Ronald E. Rosensweig<br>Lexington, Mass. |
| [21] | Appl. No. | 5,167 |
| [22] | Filed | Jan. 23, 1970 |
| [45] | Patented | Oct. 12, 1971 |
| [73] | Assignee | Ferrofluidics Corporation<br>Burlington, Mass. |

[54] BEARING ARRANGEMENT WITH MAGNETIC FLUID DEFINING BEARING PADS
18 Claims, 13 Drawing Figs.

[52] U.S. Cl............................................. 308/10
[51] Int. Cl......................................... F16c 39/06
[50] Field of Search................................. 308/9, 10; 73/516, 516 M, 518; 192/84 PM, 21, 21.5; 74/5

[56] References Cited
UNITED STATES PATENTS

| | | | |
|---|---|---|---|
| 2,718,157 | 9/1955 | Schaub......................... | 192/84 PM |
| 3,436,131 | 4/1969 | Lode............................. | 308/10 |
| 3,530,727 | 9/1970 | Albert........................... | 73/516 LM |
| 3,530,728 | 9/1970 | Evans............................ | 74/5 |

Primary Examiner—Milton O. Hirshfield
Assistant Examiner—R. Skudy
Attorneys—Richard P. Crowley and Richard L. Stevens ABSTRACT: A bearing wherein a fluid bearing pad is sealed between two bearing surfaces, such as between an inner race and an outer race. A permanent magnet and permeable pole pieces define a magnetic circuit which circuit provides for the flow of magnetic flux across at least one of the bearing surfaces. A magnetic gap on the bearing surface through which the magnetic flux flows defines a predetermined continuous peripheral pattern. The magnetic flux is concentrated at the gap and a magnetic fluid is captured therein. The other bearing surface engages the magnetic fluid in sealing relationship and the fluid-bearing pad is sealed between the bearing surfaces and within the periphery defined by the magnetic fluid seal.

PATENTED OCT 12 1971

INVENTOR
RONALD E. ROSENSWEIG
BY *Crowley & Stevens*

ATTORNEYS

INVENTOR
RONALD E. ROSENSWEIG
BY Crowley & Stevens
ATTORNEYS

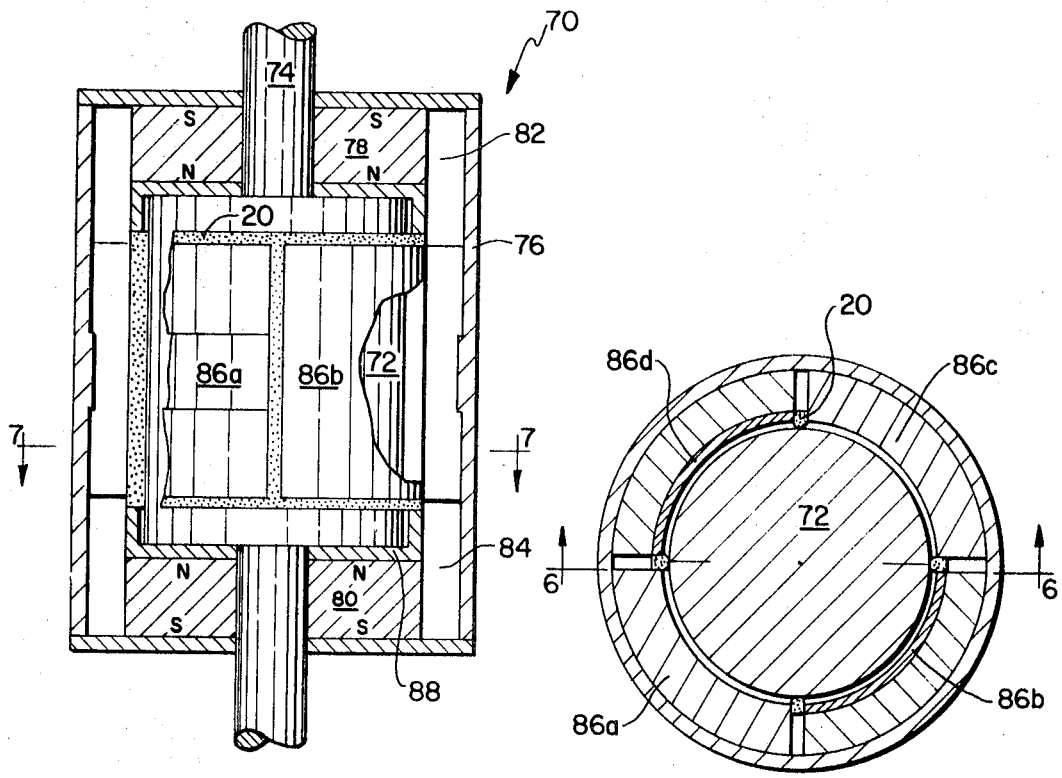
FIG. 6
FIG. 7
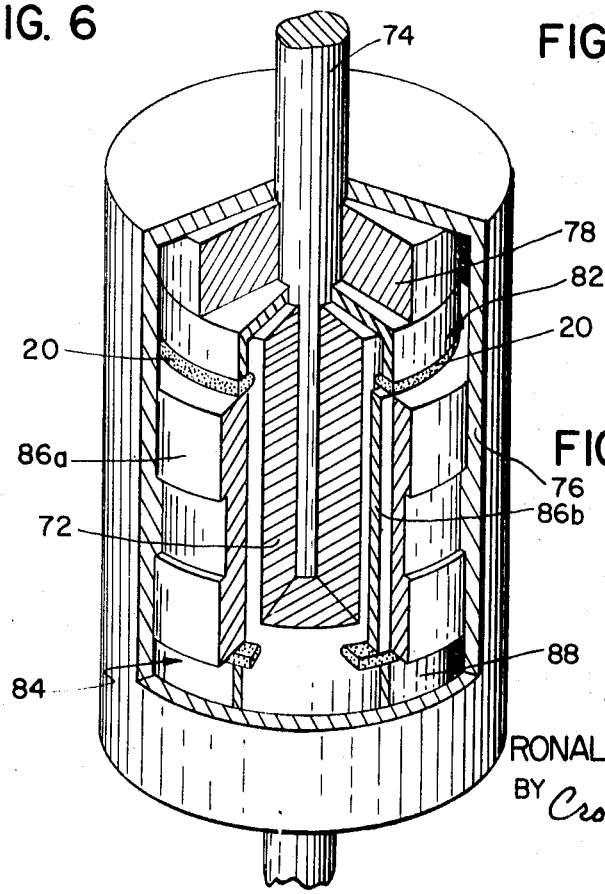
FIG. 8
INVENTOR
RONALD E. ROSENSWEIG
BY Crowley E. Stevens
ATTORNEYS INVENTOR
RONALD E. ROSENSWEIG
BY Crowley & Stevens
ATTORNEYS

BEARING ARRANGEMENT WITH MAGNETIC FLUID DEFINING BEARING PADS

SUMMARY OF THE INVENTION

Hydrostatic bearings are characterized by a particular load support feature and low stiction at low or zero surface speed. However, hydrostatic bearings are generally complex to construct and operate since a fluid flow of a gas or a liquid must be provided with the attendant requirement for pumps, orifice control, valves, conduits, energy sources, etc.

I have discovered a novel concept for bearings which employs some of the principles or features of a hydrostatic bearing and magnetic fluid seals. Briefly, my invention includes providing a fluid pad or pads between two surfaces such as first and second surfaces having relative motion one with the respect to the other. The pad is sealed between the surfaces by defining a magnetic gap continuously along a predetermined periphery. Magnetic flux passes across the gap and a magnetic fluid is captured therein. The magnetic fluid seals the pad within the predetermined area defined by the periphery and allows for relative movement of the surfaces one to the other. The entrapment of the pad by magnetic fluids may be incorporated into radial bearings, thrust bearings, or combinations of both. My bearing supports radial and/or torque loads concomitant with the support of loads which are almost purely thrust loads.

Any fluid material may be utilized in the pads such as gases like air, carbon dioxide, and nitrogen etc., or liquid such as water, oil, etc. In my invention all the bearings, as will be described in the preferred embodiments, have the distinct advantages and features of no solid surface contact resulting in no wear and long life, low friction with the attendant low loss of either the fluid which comprises the bearing pad or the magnetic fluid which is used as the sealing medium. The novel bearings as will be described are similar to hydrostatic bearings but require not active fluid supply. The various thrust or radial bearings may be combined with each other or with conventional bearings such as ball bearings, roller bearings, jewel bearings, journal bearings, magnetic bearings with or without active feedback, etc.

Brief Description of the Drawings

FIG. 6 is a sectional view of my invention employed in a radial bearing concept;

FIG. 7 is a sectional view of FIG. 6 taken along lines 7—7;

FIG. 8 is a perspective view with sections broken away of the concept shown in FIGS. 6 and 7;

DESCRIPTION OF THE PREFERRED EMBODIMENT(S)

Figure 1:
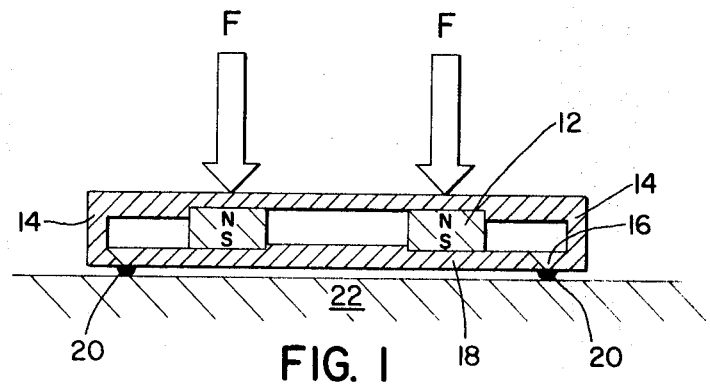
FIG. 1 is a sectional view of one embodiment of the invention employed with a thrust bearing.

FIG. 1 is an illustration of a thrust bearing which includes a ring magnet 12 magnetized across the face which produces magnetic induction which is conducted by a cup pole piece 14 which focuses the lines of magnetic flux to an intense value at an annular gap 16. The gap is formed by the undercut portion of the pole piece to provide a greater fringing condition. The flux traverses the gap and returns to the magnet via the flat pole piece 18. A magnetic fluid 20, which may include those magnetic fluids which comprise a carrier fluid such as water, hydrocarbons, fluorocarbons, etc., a surface active agent such as fatty acids, for example, a monounsaturated fatty acid like oleic acid and any magnetic-type particles like ferrous materials such as ferrite, chromium dioxide, magnetite, etc., is introduced into the gap and is evenly distributed in a ring defined by the fringing field of the gap with the rim of the fluid extending outwardly from the bottom face as shown.

The fluid filled model may then be laid flat on a nonmagnetic surface 22 with the result that a pad of air or fluid bearing pad is trapped within the enclosure defined by the nonmagnetic surface 22, the flat pole piece 18, and the peripheral ring of sealing magnetic fluid. As shown in FIG. 1 and in the following embodiments as will be described, the trapped fluid, such as air, creates a net support force and when it is compressed as by a small displacement it allows rotative and lateral movement of the surface 22 with respect to the surface 18 without contact between the moving surfaces.

Accordingly, FIG. 1 represents a low friction thrust bearing for slide or rotary motion which has little resistance to upsetting torques. If desired, it may be inverted wherein the device will react as a liquid suction cup clinging to the surface and capable of supporting its own weight and further retain its function as a rotary or slide bearing. In this embodiment it may be used as a tiltometer or an accelerometer of the inertial sensor class.

Any type of permanent magnetic material may be used with my novel bearings. For example, aluminum, nickel, cobalt compounds such as alnico V and VIII; cobalt-samarium materials, rubber-bonded magnets, ceramics, and other iron containing materials such as magnetite and ferrite may also be used. In addition, the pole pieces to which the magnetic flux passes have been described in regard to a material capable of being magnetized. Such materials are generally characterized by being soft magnetically or being very responsive to magnetism, that is, capable of high magnetic saturation although having no inherent magnetic characteristics of their own. For example, ferrous materials such as iron, cast iron, etc., may be used as well as iron alloys such as 400 series stainless steel.

Figure 2:
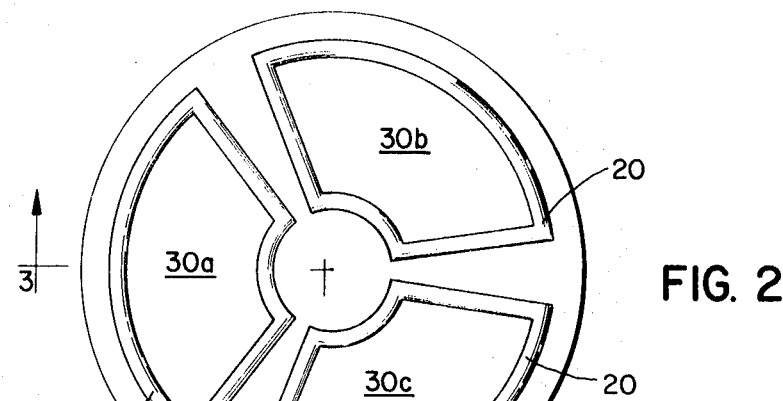
FIG. 2 is a sectional view of three padded bearing member providing thrust and moment supports.
Figure 3:
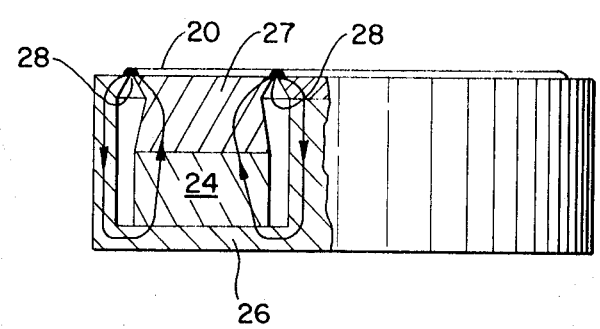
FIG. 3 is a sectional view of FIG. 2 taken along lines 3—3.

FIG. 2 is a top view of a three-padded bearing member providing thrust and moment supports and FIG. 3 is a sectional view of FIG 2 taken along lines 3—3. Referring first to FIG. 3 a continuous ring magnet 24 in combination with pole pieces 26 and 27 describes a magnetic circuit. The lines of flux are shown by the arrows and pass through the gap 28. By segmenting the air pads as shown in FIGS. 2 and 3, this prevents or inhibits the support fluid in the pad from displacing from an opposite side when off center loading is applied. Thus the upsetting torque is balanced by a restoring torque accompanying the angular displacement.

Figure 4:
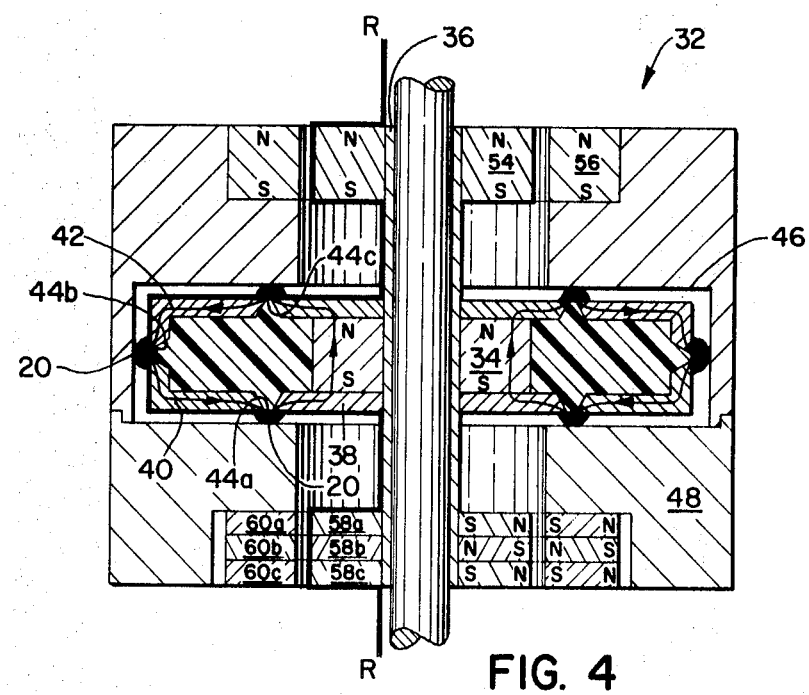
FIG. 4 is a sectional view of a thrust bearing in combination with radial repulsive magnetic support.

FIG. 4 illustrates a still further embodiment of my invention utilizing captured fluid pads and radial repulsive magnetic support. The bearing is shown generally at 32 and comprises an inner race which includes a sleeve 36, a permanent magnet 34 secured to the sleeve 36 for rotation therewith, pole pieces 38, 40, and 42 which define gaps 44a, b, and c respectively. Magnetic fluid 20 is captured in the gaps as described before and defines in combination with an inner surface 46 of an outer race 48 air pads 50 and 52.

The line R—R defines the surface of rotation between the inner race and the outer race 48 which may be secured to a fixed or moving surface such as a housing (not shown). This embodiment creates separate air pads as shown at 50 and 52 circumscribed by the peripheral magnetic fluid seal 20 on either side of the structure containing the magnet 40. Any axial displacement compresses the captured pad on one side while at the same time a pressure reduction is created in the captured fluid on the other side. Thus a push-pull pair or set of forces is set up, or in other words, a thrust pair is created for axial displacement in either direction. To achieve radial as well as thrust support, the novel thrust bearing is combined in this embodiment with radial repulsive magnetic support. As shown, a pair of axially magnetized ring magnets 54 and 56 are adapted to inhibit lateral and/or oscillatory movement (cocking) or upsetting torque. Magnet 54 is secured to sleeve 36 while magnet 56 is disposed within the outer race 48. Another means to resist an upsetting torque is illustrated by the use of alternate concentric magnets which are radially magnetized shown as 58a, b, and c and 60a, b, and c. The surface revolution of the inner race to the outer race is shown by the surface line R—R. Although this embodiment has been shown with radial repulsive magnetic support, other radial support may be utilized, such as journal bearings, ball bearings, etc.

Figure 5:
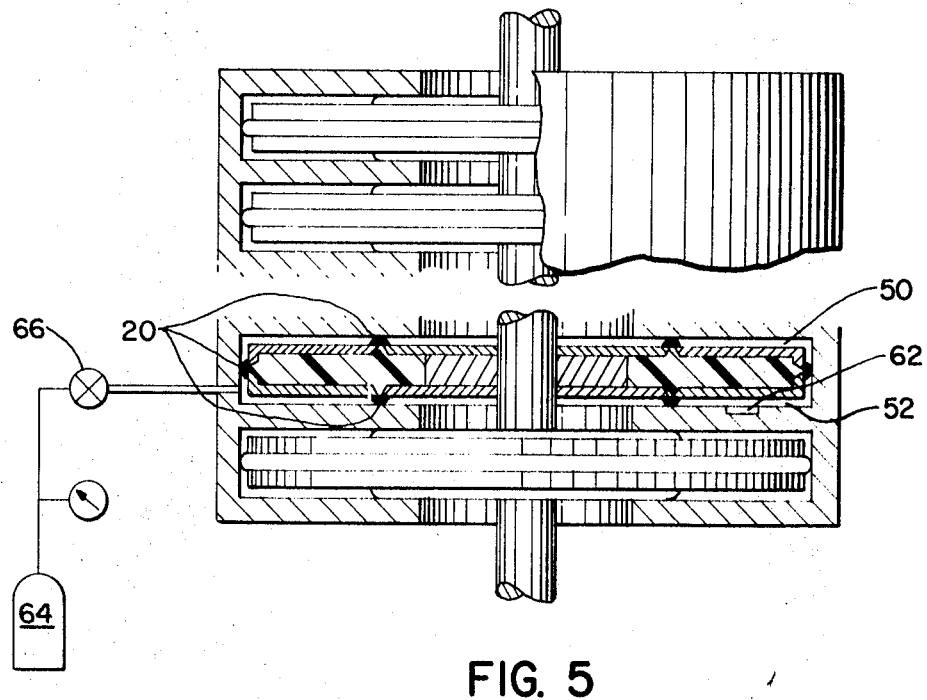
FIG. 5 is a sectional view of a staged thrust bearing.

Referring to FIG. 5, an alternative embodiment of FIG. 4 is shown (radial support means not shown). The two-sided thrust bearing is cascaded in series to provide n stages of pads in series with the resulting factor of n greater restoring thrust. If desired, a cascade may also be fashioned of the configuration illustrated in FIG. 2 in which case exceptional ability to support cocking loads or offsetting torques is achieved.

An optional feature is also shown to maintain constant vapor pressure within a particular pad. For example, a sublimating material 62 such as dichlorobenzene, napthalene, etc. may be incorporated into the air pad e.g. embedded into the wall prior to sealing by the magnetic fluid, which sublimating material may be used to control the vapor pressure in the pad in the event that there is some loss of vapor pressure through accidental loss of gas pressure from the pad through movement, diffusional mass loss, thermal expansion effect, etc. Of course, if desired pressure may be maintained through other means such as an air cylinder 64 in communication with the fluid pad including a check valve 66 disposed on a conduit 68.

A bearing having a magnetic arrangement for capturing four fluid pads on the inside of a cylindrical surface which illustrates the radial bearing concept as opposed to the thrust bearing concept is shown in FIG. 6. A front cross-sectional view of the bearing wherein pads are sealed on the inside of a cylindrical surface is shown generally at 70 and comprises an inner race which in this embodiment is a cylindrical type element 72 secured to a shaft 74. The outer housing 76 comprises two annular permanent magnets 78 and 80 and nonmagnetic annular support elements 82 and 84. Adjacent the magnets 78 and 80 are permeable distributor pole pieces 86 and 88. Secured to the support elements 82 and 84 are four cylindrical type permeable plates 86a, b, c, and d, the inner surface of which are spaced apart from the outer cylindrical surface of element 72. The perimeter of the cylindrical plates in combination with the pole pieces 86 and 88 define gaps in which are captured magnetic fluid 20. Referring to FIG. 7 which is a sectional view taken along lines 7—7 of FIG. 6, the gaps are clearly shown as filled with a magnetic fluid 20. The arrows indicate the flow of the flux lines across the gap and through the permeable return piece 76. FIG. 8 is a perspective view of the embodiment represented by FIGS. 6 and 7. The magnetic fluid 20, the outer cylindrical surface of the element 72, and the inner surfaces of the cylindrical plates are the mediums which define the boundaries and seal the four fluid pads.

Figure 9:
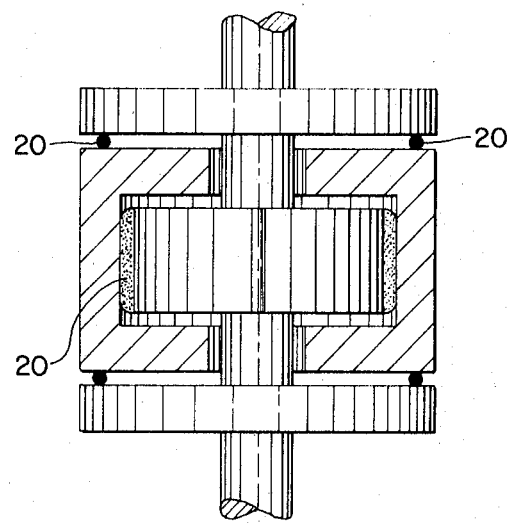
FIG. 9 is a schematic illustration of thrust and moment pads incorporated in a bearing with multiple seals.

In FIG. 9 is shown a combination of the radial bearing concept of FIGS. 6 and 7 combined with the thrust bearing of FIG. 2 to provide a stable bearing support against angular displacement or offsetting torques and axial and radial displacements. Another embodiment, of course, would be to combine the radial bearing concept of FIGS. 6 and 7 with the thrust bearing of FIG. 12 to provide a plurality of fluid pads.

Figure 10:
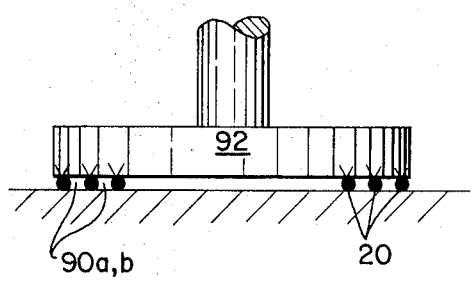
FIGS. 10 and 11 are schematic illustrations of multistaged seals capturing a plurality of pads in a thrust bearing.
Figure 11:
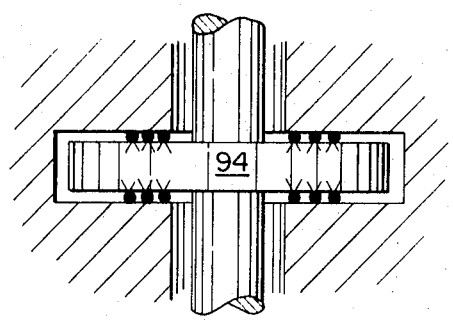

In FIG. 10 is shown a variation of the embodiment of FIG. 1 wherein a plurality of air pads 90a and b are provided on a simplified thrust bearing 92 utilizing multiple seals 20 to achieve greater load support. The face of the permeable piece is shown as having a knife edges to define the magnetic gaps. However, in this embodiment if desired, the pole pieces employed in my invention may also be doubly beveled, singly beveled, internally veed, etc.

Figure 12:
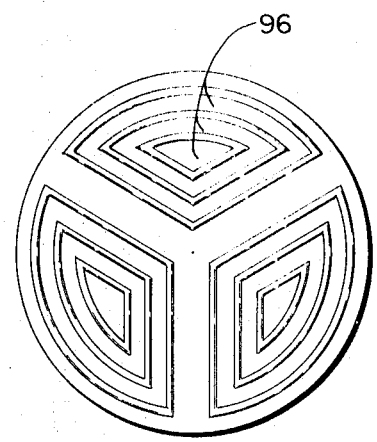
FIG. 12 is a schematic illustration of multistaged seals capturing a plurality of pads in a thrust bearing capable of supporting large forces.

FIG. 12 is a generalization of FIG. 2 and shows another embodiment of my bearing having thrust and moment support through the use of multiple peripheral seals 96. The same multiple seal arrangement may be used in the embodiment shown in FIG. 6 by the employment of multiple concentrically arranged knife edges to define the magnetic gaps.

Figure 13:
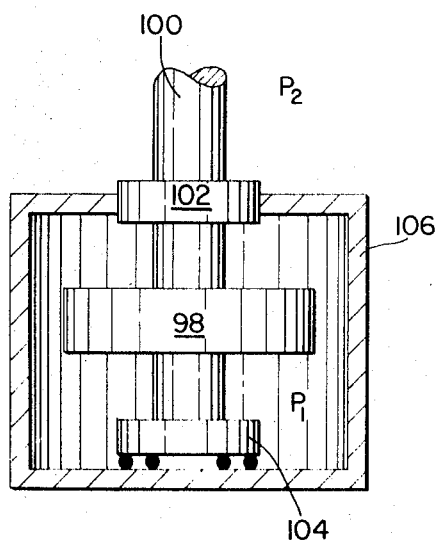
FIG. 13 is a schematic illustration of one of my bearing embodiments employed in a definite environment.

FIG. 13 is a schematic illustration which shows the use of one of two of my bearing embodiments in an inertial fly wheel system. A flywheel 98 is disposed within a housing 106 in a vacuum environment $P_1$. A shaft 100 passes through bearing 102, flywheel 98 and is secured to thrust bearing 104. Bearing 104 supports the load and is constructed in a similar manner as shown in FIG. 10, that is having multiple fluid bearing pads. The bearing 102 is constructed in accordance with FIG. 6 and in addition to providing the fluid pads as previously described also seals the vacuum environment $P_1$ form the atmosphere $P_2$ where the shaft intersects the housing. More specifically, the bearing 102 also acts as a magnetic fluid seal in a manner as disclosed in my copending application Ser. No. 865,281, filed Oct. 10, 1969, which is hereby incorporated by reference in this application in its entirety. The shaft power may be supplied or removed electrically, hydraulically, mechanically, etc.

As will be clear from the foregoing description, the bearing concept I have developed utilizing fluid pads such as air pads sealed with magnetic fluid may be used in any great number of bearing environments. For example, this concept may be applied in an inertial fly wheel energy storage where low loss and long life are key factors. Modern composite high strength materials make possible high speed flywheel energy reservoirs which are spun in a vacuum to reduce friction losses. Seals as disclosed in this specification are advantageous to ensure vacuum in the face of the shaft penetration, such as disclosed in my copending application Ser. No. 865,281, filed Oct. 10, 1969, now abandoned. They may also be used as thrust and radial bearings for engines such as aircraft jet engines, helicopter rotors and blades; for fly wheel power sources such as silent lawn mowers, silent marine engines; central power generating plants, space vehicles, submarines, etc., particularly when using the radially segmented face seals to strongly resist upsetting torques and longitudinally disposed seals along a shaft in groups of three or more pads to achieve radial bearing supports. These practical embodiments permit the bearing to support radial and/or torque loads concomitant with the support of loads which are almost purely thrust loads.

Also, in referring to FIG. 4, the line R—R describes the surface of revolution as the shaft and inner race rotate with respect to the outer race. As can be clearly seen, the magnetic fluid maintains a complete pressure-type seal while stationary or rotating. Upon rotation of the shaft, the magnetic seal which captures the fluid pad remains pressure tight and accordingly, the fluid pad remains captured at all times whether the shaft is rotating or stationary. Although the various bearing embodiments such as the thrust bearings, the radial bearings or the combination of both radial and thrust bearings using a plurality of fluid pads captured in various embodiments have been described generally in reference to the movement of a shaft in combination with a housing or outer baring surface, it is obvious that the housing to which the outer race is secured or the baring surface which engages the simplified thrust bearings such as shown in FIG. 1, 2, 3, and 10 may move at the same speed, a greater speed, or less speed than that of which the shaft is rotating and in either the same direction as the shaft or in the opposite direction of the shaft. Also, it has been generally described in reference to a solid shaft; however, the shaft may take the form of a bushing passing through the inner race and may assume various configurations in the form of a ring element, a collar, or a sleeve.

Having described my invention, what I now claim is:

1. A bearing which comprises:
   a. a first element having a first surface;
   b. a second element having a second surface spaced apart from the surface of the first element and adapted for relative movement in reference thereto and further adapted to engage in sealing relationship a peripheral magnetic fluid seal;

c. fluid support means disposed between said surfaces and providing a fluid bearing surface;
d. magnet means to capture magnetic fluid along a periphery disposed on at least one of said surfaces; and
e. magnetic fluid captured along the periphery whereby the fluid support means is sealed between the surfaces.

2. The baring of claim 1 wherein the magnet means includes a permanent magnet in combination with permeable pole pieces disposed within the first element, and further includes gap means defined on the first surface, and wherein the second surface engages the magnetic fluid and seals in part the fluid support means.

3. The bearing of claim 1 wherein the first element is a disc-type element and the magnet means includes a ring magnet disposed within the disc-type element, and further includes at least two concentrically arranged knife edges spaced apart from one another on the first surface of the first element.

4. The bearing of claim 1 wherein the magnetic means includes means to establish at least two magnetic fluid peripheries on the surface of the first element to define fluid support means therebetween.

5. The bearing of claim 1 which includes means to maintain constant pressure within the fluid support means.

6. The bearing of claim 5 wherein the means to maintain the pressure within the fluid support means includes sublimating means.

7. The bearing of claim 1 wherein the first element includes an upper and a lower surface, the means to capture the magnetic fluid along a periphery includes at least one peripheral magnetic fluid seal on each of the upper and lower surfaces, and wherein the second element includes lower and upper surfaces adapted to engage respectively the peripheral magnetic fluid seals on the upper and lower surfaces of the first element to seal fluid bearing pads to the respective surface.

8. The bearing of claim 7 wherein the bearing pads are cascaded in a plurality of stages.

9. The bearing of claim 1 which includes means to provide radial support.

10. The bearing of claim 9 wherein the first element has an upper surface, shaft means extend upwardly from said surface, the second element extends over the upper surface of the first element and inwardly toward said shaft means, and the means to provide radial support is disposed between the shaft means and the second element.

11. The bearing of claim 10 wherein the means to provide radial support includes journal bearing means.

12. The bearing of claim 10 wherein the means to provide radial support includes repulsive magnetic support.

13. A bearing which comprises:
a first cylindrical-type element having an outer surface, said surface adapted to engage in sealing relationship a peripheral magnetic fluid seal;
a second element disposed about the first element and having an inner surface spaced apart from the outer surface of the first element and adapted for movement in reference thereto;
fluid support means disposed between the inner and outer surfaces;
magnet means to define at least one peripheral gap on at least one of said surfaces; and
magnetic fluid captured in the peripheral gap whereby the fluid support means is sealed between the two surfaces.

14. The bearing of claim 13 which includes a plurality of peripheral magnetic gaps disposed in generally rectangular form on the inner surface of the outer element.

15. The bearing of claim 13 which includes a plurality of peripheral magnetic gaps disposed in generally rectangular form on the outer surface of the inner element.

16. The bearing of claim 13 wherein the second element extends radially inward and is spaced apart from at least one of the bases of the cylindrical first element, the second element further including a first bearing surface; and means to provide thrust and moment support said means adapted to engage in bearing relationship the first bearing surface of the second element.

17. The bearing of claim 16 wherein the means to provide thrust and moment support includes a third element having a lower surface spaced apart from the first bearing surface of the second element and adapted for relative movement in reference thereto and further adapted to engage in sealing relationship a peripheral magnetic fluid seal;
fluid support means disposed between the first bearing surface and the lower surface and providing a fluid bearing surface;
magnet means to define a peripheral gap on at least one of said surfaces disposed on one of said surfaces; and
magnetic fluid captured along the peripheral gap whereby the fluid support means is sealed between the first bearing surface and lower surface.

18. A method for providing a bearing which method comprises:
a. providing a first bearing surface;
b. providing a second bearing surface;
c. establishing at least one periphery adapted to capture a magnetic fluid on one of said surfaces;
d. capturing a magnetic fluid along the periphery;
e. engaging the magnetic fluid in sealing relationship with the other surface; and
f. sealing a fluid pad between first and second surface and within the boundary defined by the magnetic fluid.